(12) United States Patent
Lee et al.

(10) Patent No.: US 9,761,911 B2
(45) Date of Patent: *Sep. 12, 2017

(54) BATTERY PACK OF IMPROVED SAFETY

(71) Applicant: LG CHEM, LTD., Seoul (KR)

(72) Inventors: Jin Kyu Lee, Daejeon (KR); Dalmo Kang, Daejeon (KR); Junseok Choi, Daejeon (KR); Seongtae Kim, Incheon (KR); Taehyuck Kim, Daejeon (KR); Taehwan Roh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,875

(22) Filed: Aug. 21, 2013

(65) Prior Publication Data

US 2013/0337297 A1  Dec. 19, 2013

Related U.S. Application Data

(63) Continuation of application No. PCT/KR2012/003137, filed on Apr. 24, 2012.

(30) Foreign Application Priority Data

May 17, 2011  (KR) .................. 10-2011-0046117

(51) Int. Cl.
 *H01M 10/42* (2006.01)
 *H01M 2/10* (2006.01)
 (Continued)

(52) U.S. Cl.
 CPC ....... *H01M 10/4235* (2013.01); *B60L 3/0046* (2013.01); *B60L 3/04* (2013.01);
 (Continued)

(58) Field of Classification Search
 CPC ............. H01M 2/345; H01M 10/4235; H01M 2/1077; H01M 2/206; H01M 2200/20
 See application file for complete search history.

(56) References Cited

U.S. PATENT DOCUMENTS 6,295,189 B1  9/2001  Perelle et al.
2005/0208358 A1  9/2005  Nishimura et al.
(Continued)

FOREIGN PATENT DOCUMENTS

CN  101038975 A  9/2007
CN  101248546 A  8/2008
(Continued)

OTHER PUBLICATIONS

Machine translation for Fukuzawa, JP 2006-185709 A. (Translation obtained on: Aug. 7, 2015.).*

(Continued)

*Primary Examiner* — Barbara Gilliam
*Assistant Examiner* — Angela Martin
(74) *Attorney, Agent, or Firm* — Birch, Stewart, Kolasch & Birch, LLP

(57) ABSTRACT

Disclosed herein is a battery pack including a power supply unit including two or more battery cells or battery modules electrically connected to each other, at least one pressure driven switch configured to cause a short circuit in a portion or the entirety of the battery pack upon detecting expansion in volume of the battery cells or the battery modules when the power supply unit malfunctions, a cut-off portion located at at least one series connection region between the battery cells or the battery modules to interrupt electrical connection in the battery pack when the short circuit occurs in the battery pack, and external input and output terminals connected to electrode terminals located at outermost sides of the power supply unit to supply power to an external device.

12 Claims, 4 Drawing Sheets

(51) Int. Cl.
*H01M 2/34* (2006.01)
*H01M 2/20* (2006.01)
*B60L 3/00* (2006.01)
*B60L 3/04* (2006.01)
*B60L 11/18* (2006.01)

(52) U.S. Cl.
CPC ....... *B60L 11/1864* (2013.01); *H01M 2/1077* (2013.01); *H01M 2/206* (2013.01); *H01M 2/345* (2013.01); *B60L 2240/547* (2013.01); *B60L 2240/549* (2013.01); *H01M 2200/20* (2013.01); *H01M 2220/20* (2013.01); *Y02T 10/7011* (2013.01); *Y02T 10/7061* (2013.01)

(56) References Cited

U.S. PATENT DOCUMENTS

| | | | |
|---|---|---|---|
| 2006/0267545 A1* | 11/2006 | Lee et al. | 320/106 |
| 2007/0054157 A1* | 3/2007 | Ryu et al. | 429/7 |
| 2007/0210752 A1* | 9/2007 | Yoon | 320/116 |
| 2010/0062329 A1* | 3/2010 | Muis | H01M 2/206 429/158 |
| 2011/0039147 A1* | 2/2011 | Cheon et al. | 429/159 |
| 2011/0095725 A1* | 4/2011 | Troxel et al. | 320/118 |

FOREIGN PATENT DOCUMENTS

| | | | | |
|---|---|---|---|---|
| CN | 101997131 A | | 3/2011 | |
| EP | 2 226 868 A1 | | 9/2010 | |
| EP | 2 284 929 A1 | | 2/2011 | |
| JP | 2000-208170 A | | 7/2000 | |
| JP | 2001-210308 A | | 8/2001 | |
| JP | 2003-197268 A | | 7/2003 | |
| JP | 2005-183176 A | | 7/2005 | |
| JP | 2005-268086 A | | 9/2005 | |
| JP | 2006-185709 A | | 7/2006 | |
| JP | 2006185709 A | * | 7/2006 | ............. H01M 2/34 |
| KR | 10-2001-0037119 A | | 5/2001 | |
| KR | 10-2009-0052520 A | | 5/2009 | |
| KR | 10-2011-001778 A | | 2/2011 | |

OTHER PUBLICATIONS

"wiring harness." Dictionary.com Unabridged. Random House, Inc. Accessed on: Aug. 9, 2015. <http://dictionary.reference.com/browse/wiring harness>.*
"Bus Bar." WordNet 3.0. 2006. Princeton University. Accessed on: Aug. 9, 2015. <https://www.wordnik.com/words/busbar>.*
International Search Report issued in PCT/KR2012/003137, mailed on Oct. 18, 2012.
Chinese Office Action with English translation mailed on Apr. 3, 2015 in corresponding Chinese application No. 201280019512.1.

* cited by examiner

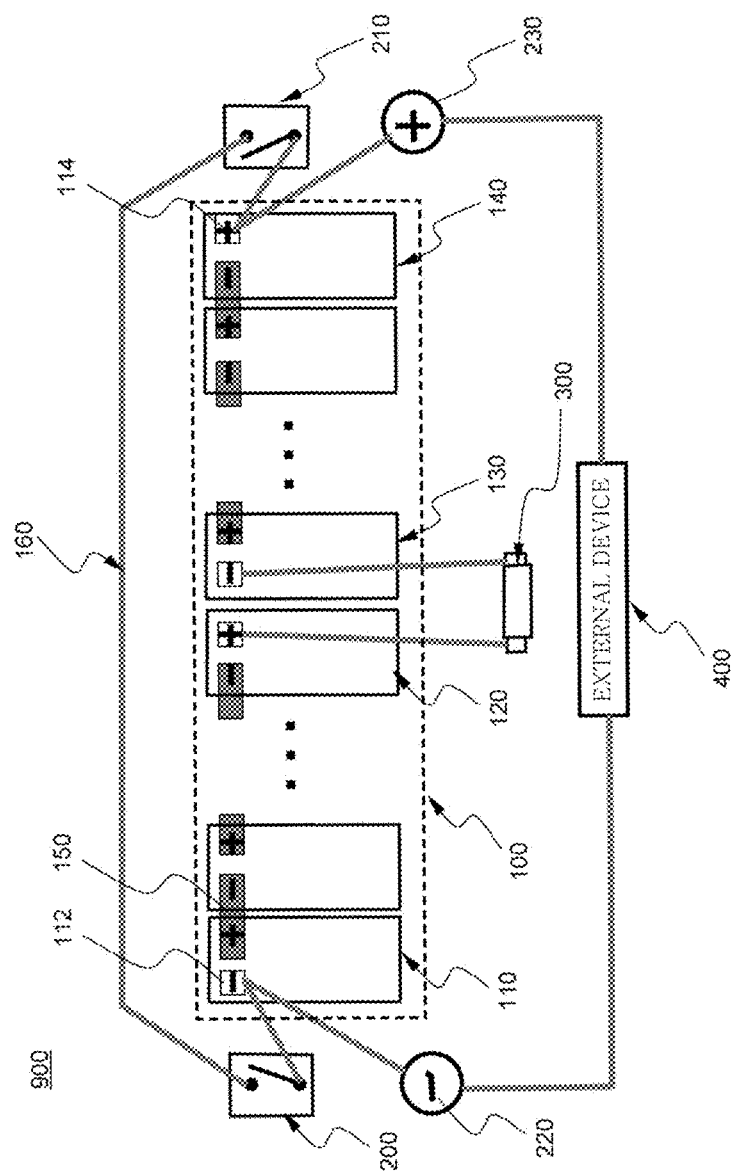
[FIG. 1]

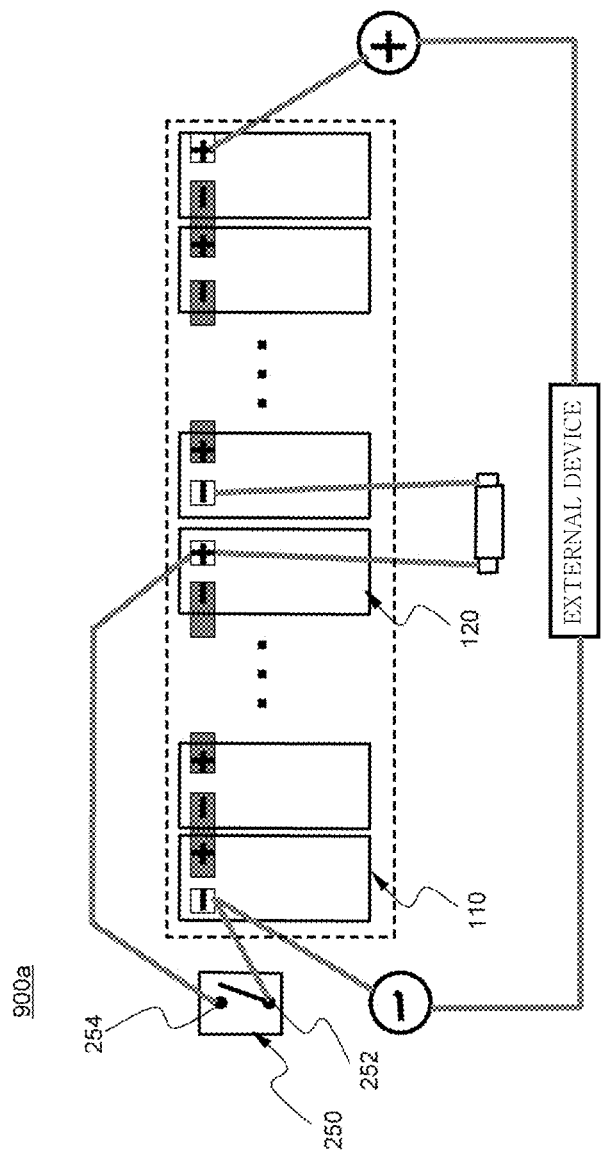
[FIG. 2]

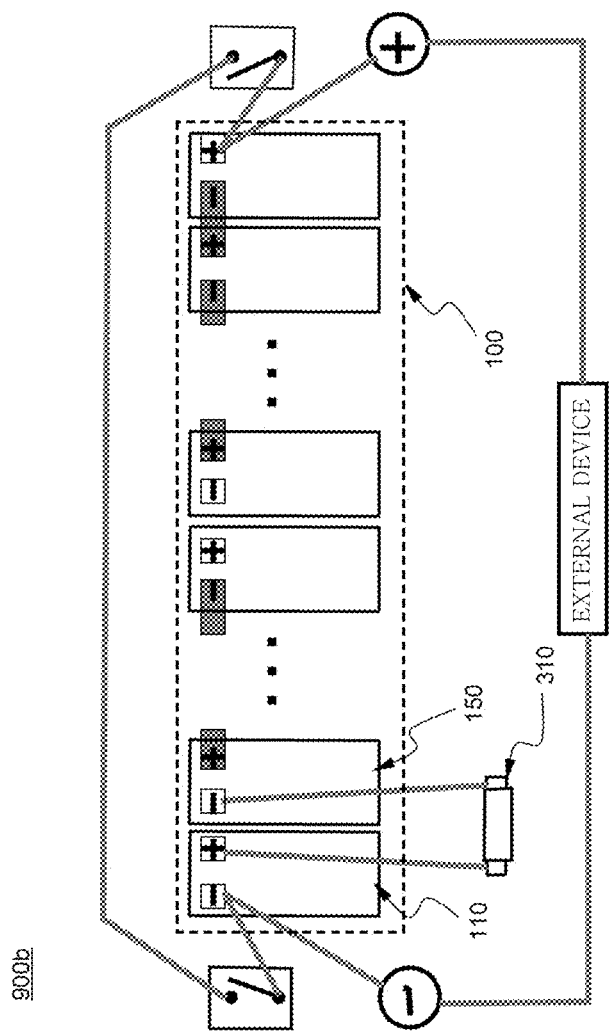
[FIG. 3]

[FIG. 4]
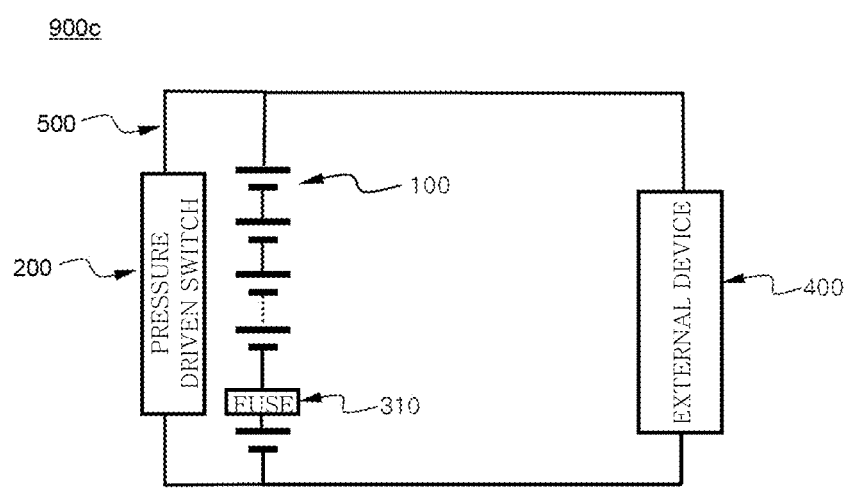

BATTERY PACK OF IMPROVED SAFETY

CROSS REFERENCE TO RELATED APPLICATIONS

This application is a Bypass Continuation of PCT International Application No. PCT/KR2012/003137 filed on Apr. 24, 2012, which claims priority under 35 U.S.C §119(a) to Patent Application No. 10-2011-0046117 filed in the Republic of Korea on May 17, 2011, all of which are hereby expressly incorporated by reference into the present application.

TECHNICAL FIELD

The present invention relates to a battery pack with improved safety and, more particularly, to a battery pack including a power supply unit including two or more battery cells or battery modules electrically connected to each other, at least one pressure driven switch configured to cause a short circuit in a portion or the entirety of the battery pack upon detecting expansion in volume of the battery cells or the battery modules when the power supply unit malfunctions, a cut-off portion located at at least one series connection region between the battery cells or the battery modules to interrupt electrical connection in the battery pack when the short circuit occurs in the battery pack, and external input and output terminals connected to electrode terminals located at outermost sides of the power supply unit to supply power to an external device.

BACKGROUND ART

As mobile devices have been increasingly developed and the demand for such mobile devices has increased, the demand for secondary batteries has sharply increased as an energy source for the mobile devices. Among such secondary batteries is a lithium secondary battery having high energy density and discharge voltage, into which much research has been carried out and which is now commercialized and widely used.

A secondary battery has attracted considerable attention as an energy source for power-driven devices, such as an electric bicycle (E-bike), an electric vehicle (EV), and a hybrid electric vehicle (HEV), as well as an energy source for mobile wireless electronic devices, such as a mobile phone, a digital camera, a personal digital assistant (PDA), and a laptop computer.

A small-sized battery pack, in which a battery cell is provided, is used for small-sized devices, such as a mobile phone and a digital camera. On the other hand, a middle or large-sized battery pack, in which a battery pack including two or more battery cells (hereinafter, occasionally referred to as a "multi-cell") connected to each other in parallel and/or in series is provided, is used for middle or large-sized devices, such as a laptop computer and an electric vehicle.

A lithium secondary battery exhibits excellent electrical properties, such as large capacity and high discharge voltage; however, the lithium secondary battery has low safety. For example, when abnormal operations, such as overcharge, overdischarge, exposure to high temperature, and an electrical short circuit, of the lithium secondary battery occur, decomposition of active materials and an electrolyte, which are components of the battery, is caused with the result that heat and gas are generated and the high-temperature and high-pressure conditions caused by generation of the heat and the gas accelerate the above-mentioned decomposition. Eventually, a fire or explosion may occur.

For this reason, the lithium secondary battery is provided with a safety system, such as a protection circuit to interrupt electric current when the battery is overcharged or overdischarged or when overcurrent flows in the battery, a positive temperature coefficient (PTC) element whose resistance greatly increases so as to interrupt electric current when the temperature of the battery increases, and a safety vent to interrupt electric current or exhausting gas when pressure increases due to generation of the gas. In case of a small-sized cylindrical secondary battery, for example, the PTC element and the safety vent are usually disposed at the top of an electrode assembly (a generating element) having a cathode/separator/anode structure, which is mounted in a cylindrical container. In case of a small-sized prismatic or pouch-shaped secondary battery, on the other hand, the protection circuit module and the PTC element are usually mounted at the upper end of a prismatic container or a pouch-shaped case, in which the generating element is mounted in a sealed state.

The safety-related problem of the lithium secondary battery is even more serious for a middle or large-sized battery pack having a multi-cell structure. Since a plurality of battery cells is used in the multi-cell battery pack, abnormal operation of some of the battery cells may cause abnormal operation of the other battery cells with the result that a fire or explosion may occur, which may lead to a large-scale accident. For this reason, the middle or large-sized battery pack is provided with a safety system, such as a battery management system (BMS), to protect the battery cells from overcharge, overdischarge, and overcurrent.

Meanwhile, as the lithium secondary battery is continuously used, i.e. as the lithium secondary battery is repeatedly charged and discharged, the generating element and electrical connection members are gradually degraded. For example, degradation of the generating element leads to decomposition of electrode materials and the electrolyte, by which gas is generated. As a result, the battery cell (the container or the pouch-shaped case) gradually swells. In a normal state of the lithium secondary battery, an active controller, such as the BMS, detects overdischarge, overcharge, or overcurrent of the battery pack. In a case in which the detected overdischarge, overcharge, or overcurrent of the battery pack is excessive, the active controller interrupts electrical connection in the battery pack to lower the risk of the battery pack.

In a case in which the active controller is used as described above, however, it is necessary to supply electric current to the BMS. If no electric current is supplied to the BMS, the BMS may not protect the battery pack.

Therefore, there is a high necessity for technology that is capable of fundamentally securing safety of the battery pack while solving the above problems.

DISCLOSURE

Technical Problem

The present invention has been made to solve the above problems and other technical problems that have yet to be resolved.

As a result of a variety of extensive and intensive studies and experiments, the inventors of the present application have found that, in a case in which a battery pack includes a pressure driven switch and a cut-off portion, which have specific construction in the battery pack, the pressure driven switch operates to cause a short circuit in a portion or the entirety of the battery pack upon detecting expansion in volume of battery cells or battery modules when the battery pack is overcharged and the cut-off portion interrupts electrical connection in the battery pack due to such a short circuit caused in the battery pack, thereby securing safety of the battery pack to a desired level.

Therefore, it is an object of the present invention to provide a battery pack having a specific structure to improve safety.

Technical Solution

In accordance with one aspect of the present invention, the above and other objects can be accomplished by the provision of a battery pack including a power supply unit including two or more battery cells or battery modules electrically connected to each other, at least one pressure driven switch configured to cause a short circuit in a portion or the entirety of the battery pack upon detecting expansion in volume of the battery cells or the battery modules when the power supply unit malfunctions, a cut-off portion located at at least one series connection region between the battery cells or the battery modules to interrupt electrical connection in the battery pack when the short circuit occurs in the battery pack, and external input and output terminals connected to electrode terminals located at outermost sides of the power supply unit to supply power to an external device.

In a conventional battery pack configured to have a power supply unit including a plurality of battery cells or battery modules connected to each other, as previously described, a battery management system (BMS) detects an operation state of the power supply unit and controls charge and discharge of the power supply unit based on the detected operation state of the power supply unit, thereby securing safety of the battery pack. In a case in which the BMS does not operate due to interruption in supply of electric current, however, it is not possible to control charge and discharge of the power supply unit.

On the other hand, the battery pack according to the present invention includes a pressure driven switch and a cut-off portion configured to operate independently of the BMS. When the power supply unit malfunctions, the pressure driven switch operates to cause a short circuit in a portion or the entirety of the battery pack upon detecting expansion in volume of the battery cells or the battery modules. When such a short circuit occurs in the battery pack, the cut-off portion may interrupt electrical connection in the battery pack. Consequently, overcurrent or overvoltage of the power supply unit is prevented from being transmitted to the external input and output terminals, thereby securing safety and reliability of the battery pack.

In addition, the battery pack according to the present invention uses pressure generated when the battery cells or the battery modules are overcharged. Consequently, it is possible to protect the battery pack from overcharge.

Moreover, the pressure driven switch and the cut-off portion may be mounted in the battery pack without great change in structure of the battery pack. Consequently, the battery pack may be configured to have a safe structure.

In a preferred example, the pressure driven switch may be electrically connected to at least one battery cell or unit module in the power supply unit. Consequently, it is possible for the pressure driven switch to easily detect the increase in volume of the battery cell or unit module due to abnormal operation of the battery pack.

The pressure driven switch may be mounted at various positions of the power supply unit. The pressure driven switch may cause a short circuit in a portion of the battery pack or in the entirety of the battery pack depending upon the position of the power supply unit at which the pressure driven switch is mounted.

In a concrete example, the pressure driven switch may include two or more pressure driven switches located at the outermost sides of the power supply unit. In this structure, it is possible for the pressure driven switch to easily detect the volume of the battery cells or the battery modules located at the outermost sides of the power supply unit. Furthermore, in a case in which the pressure driven switch includes two or more pressure driven switches, it is possible for the pressure driven switch to more sensitively respond to the increase in volume of the battery cells or the battery modules.

In the above structure, the two or more pressure driven switches may be electrically connected to each other.

For example, the two or more pressure driven switches may be electrically connected to each other via a wire harness.

Meanwhile, the pressure driven switch may be configured to operate when expansion in volume of the battery cells or the battery modules is increased to a predetermined value or more.

The predetermined value may be arbitrarily decided based on the structure or capacity of the battery pack. If the predetermined value is too small, the pressure driven switch may too sensitively respond to the increase in volume of the battery cells or the battery modules. On the other hand, if the predetermined value is too large, the pressure driven switch may too insensitively respond to the increase in volume of the battery cells or the battery modules. For example, the predetermined value may be set to 1 to 30% the volume of the battery cells or the battery modules.

Preferably, the pressure driven switch is configured such that the pressure driven switch is set to an electrical cut-off state (OFF) under normal operation conditions of the battery cells or the battery modules and is switched to an electrical conduction state (ON) when volume of the battery cells or the battery modules expands.

Specifically, the pressure driven switch is set to the electrical cut-off state under normal operation conditions of the battery cells or the battery modules. Consequently, electric current generated by the power supply unit is supplied only to the external device such that the external device is driven.

Under abnormal operation conditions of the battery cells or the battery modules, on the other hand, volume of the battery cells or the battery modules expands to switch the pressure driven switch to the electrical conduction state. As a result, a short circuit is caused in the battery pack. Due to such a short circuit, the cut-off portion is broken with the result that the supply of electric current from the power supply unit to the external device is interrupted.

In a preferred example for the above operation, the battery pack may further include a circuit connected to the power supply unit in parallel, wherein the pressure driven switch may be located on the circuit.

The expansion in volume of the battery cells or the battery modules may be caused by various factors, such as overcharge of the power supply unit and overcurrent in the power supply unit. For example, a swelling phenomenon, in which the battery cells or the battery modules swell, may occur due to overcharge of the power supply unit, overcurrent in the power supply unit, abnormal operation of the battery pack, or degradation of the battery pack caused as the result of charge and discharge for a long period of time.

Electrode terminals of the battery cells or the battery modules may be electrically connected to each other without additional connection members. Alternatively, the electrode terminals of the battery cells or the battery modules may be electrically connected to each other via bus bars.

The cut-off portion is not particularly restricted so long as the cut-off portion easily interrupts electrical connection in the battery pack when a short circuit occurs in the battery pack. For example, the cut-off portion may be a fuse. However, the cut-off portion is not limited thereto.

The shape of each of the battery cells is not particularly restricted. Each of the battery cells may be a cylindrical battery cell, a prismatic battery cell, or a pouch-shaped battery cell. For example, each of the battery cells may be a pouch-shaped battery cell having an electrode assembly mounted in a case formed of a laminate sheet comprising a resin layer and a metal layer. Preferably, each of the battery cells is a pouch-shaped lithium secondary battery.

The battery pack according to the present invention may be manufactured by combining battery modules based on desired output and capacity. In addition, the battery pack according to the present invention may be used as a power source for an electric vehicle, a hybrid electric vehicle, a plug-in hybrid electric vehicle, or a power storage device in consideration of installation efficiency and structural stability. However, an applicable range of the battery pack according to the present invention is not limited thereto.

In accordance with another aspect of the present invention, there is provided a device including the battery pack with the above-stated construction as a power source. Specifically, the device may be an electric vehicle, a hybrid electric vehicle, a plug-in hybrid electric vehicle, or a power storage device.

A structure and manufacturing method of such a device are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a view showing construction of a battery pack according to an embodiment of the present invention;

FIGS. 2 and 3 are views showing construction of battery packs according to other embodiments of the present invention; and FIG. 4 is a view showing circuitry of a battery pack according to a further embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 1 is a view typically showing construction of a battery pack according to an embodiment of the present invention.

Referring to FIG. 1, a battery pack 900 includes a power supply unit 100 including a plurality of battery modules 110, 120, 130, and 140 electrically connected to each other, a pair of pressure driven switches 200 and 210, a cut-off portion 300, and a pair of external input and output terminals 220 and 230 electrically connected to an external device 400.

When the power supply unit 100 malfunctions, the pressure driven switches 200 and 210 operate to cause a short circuit in the battery pack 900 upon detecting expansion in volume of the battery modules 110, 120, 130, and 140.

The cut-off portion 300, such as a fuse, is located at a series connection region between the battery modules 120 and 130, which are located at the middle part of the battery pack 900 to interrupt electrical connection in the battery pack 900 when a short circuit occurs in the battery pack 900.

The external input and output terminals 220 and 230 are electrically connected to an anode terminal 112 and a cathode terminal 114 of the battery modules 110 and 140 located at the outermost sides of the power supply unit 100 to supply power to the external device 400, respectively.

In addition, the pressure driven switches 200 and 210 are located adjacent to the outsides of the battery modules 110 and 120 located at the outermost sides of the power supply unit 100. When the expansion in volume of the outermost battery modules 110 and 120 is increased to a predetermined value or more, therefore, a state of the pressure driven switches 200 and 210 is switched from an electrical cut-off state to an electrical conduction state.

Specifically, the pressure driven switches 200 and 210 are set to the electrical cut-off state (OFF) under normal operation conditions of the battery modules 110, 120, 130, and 140. When the volume of the battery modules 110, 120, 130, and 140 expands under electrical conduction conditions, such as overcharge or overcurrent, of the power supply unit 100, the pressure driven switches 200 and 210 are switched to the electrical conduction state (ON) upon detecting the expansion in volume of the battery modules 110, 120, 130, and 140.

In addition, the pressure driven switches 200 and 210 are electrically connected to each other via a wire harness 160. Electrode terminals of the battery modules 110, 120, 130, and 140 are connected to each other via bus bars 150.

FIGS. 2 and 3 are views typically showing construction of battery packs according to other embodiments of the present invention.

Referring to these drawings, a battery pack 900a of FIG. 2 is identical in structure to the battery pack 900 of FIG. 1 except that one terminal 252 of a pressure driven switch 250 is connected to an anode terminal of an outermost battery module 110 via a wire and the other terminal 254 of the pressure driven switch 250 is connected to a cathode terminal of a middle battery module 120 via a wire.

A battery pack 900b of FIG. 3 is identical in structure to the battery pack 900 of FIG. 1 except that a fuse 310 electrically connects an anode terminal and a cathode terminal of battery modules 110 and 150 located at the left side of a power supply unit 100 to each other.

FIG. 4 is a view typically showing circuitry of a battery pack according to a further embodiment of the present invention.

Referring to FIG. 4, a battery pack 900c includes a parallel circuit 500 connected to a power supply unit 100 in parallel. A pressure driven switch 200 is located on the parallel circuit 500.

Specifically, the pressure driven switch 200 is set to an electrical cut-off state under a normal operation condition of the power supply unit 100. Consequently, current generated by the power supply unit 100 normally flows to an external device.

When the power supply unit 100 malfunctions, however, the volume of battery modules of the power supply unit 100 expands. At this time, the pressure driven switch 200 is switched from the electrical cut-off state to an electrical conduction state upon detecting the expansion in volume of the battery modules.

In this case, much more electric current abruptly flows to the parallel circuit 500, resistance of which is low, and a fuse 310, which is a resistance body, than to an external device 400, resistance of which is high. Heat is generated from the fuse 310 due to the electric current abruptly supplied to the fuse 310 with the result that the fuse 310 may blow. Due to cut-off of the fuse 310, charge and discharge of the battery modules are stopped, thereby securing safety of the battery pack 900c.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention includes a pressure driven switch and a cut-off portion, which have specific construction in the battery pack. In the event of abnormal operation of the battery pack, the pressure driven switch operates to cause a short circuit in a portion or the entirety of the battery pack upon detecting expansion in volume of battery cells or battery modules. When such a short circuit occurs in the battery pack, the cut-off portion interrupts electrical connection in the battery pack. Consequently, it is possible to greatly improve safety of the battery pack.

In addition, the battery pack according to the present invention includes a cut-off portion that is capable of interrupting electrical connection in the battery pack in response to an operation state of a power supply unit independently of a battery management system (BMS). Even in a case in which the BMS does not operate, therefore, it is possible to secure safety of the battery pack, thereby greatly improving reliability of the battery pack.

Moreover, the pressure driven switch and the cut-off portion may be mounted in the battery pack. Consequently, it is possible to easily manufacture the battery pack without changing the structure thereof.

The invention claimed is:

1. A battery pack comprising:
a power supply unit comprising three or more battery cells or battery modules electrically connected to each other;
at least one pressure driven switch configured to cause a short circuit in a portion or the entirety of the battery pack upon detecting expansion in volume of the battery cells or the battery modules when the power supply unit malfunctions;
a cut-off portion located at at least one series connection region between the battery cells or the battery modules to interrupt electrical connection in the battery pack when the short circuit occurs in the battery pack; and
external input and output terminals connected to electrode terminals located at outermost sides of the power supply unit to supply power to an external device,
wherein the pressure driven switch comprises two or more pressure driven switches, all of which are located only at the outermost sides of the power supply unit, and the two or more pressure driven switches are electrically connected to each other via a wire harness between opposite ends of the power supply unit, and
wherein each of the battery cells is a pouch-shaped battery cell having an electrode assembly mounted in a case formed of a laminate sheet comprising a resin layer and a metal layer.

2. The battery pack according to claim 1, wherein the pressure driven switch is electrically connected to at least one battery cell or unit module in the power supply unit.

3. The battery pack according to claim 1, wherein the pressure driven switch is configured to operate when expansion in volume of the battery cells or the battery modules is increased to a predetermined value or more.

4. The battery pack according to claim 1, wherein the pressure driven switch is set to an electrical cut-off state (OFF) under normal operation conditions of the battery cells or the battery modules and is switched to an electrical conduction state (ON) when volume of the battery cells or the battery modules expands.

5. The battery pack according to claim 1, wherein electrode terminals of the battery cells or the battery modules are electrically connected to each other via bus bars.

6. The battery pack according to claim 1, wherein the cut-off portion is a fuse.

7. A device comprising a battery pack according to claim 1 as a power source.

8. The device according to claim 7, wherein the device is an electric vehicle or a power storage device.

9. The battery pack according to claim 1, wherein the pressure driven switch comprises only two pressure driven switches, said only two pressure driven switches being located at opposite, outermost sides of the power supply unit.

10. The battery pack according to claim 1, wherein the cut-off portion located at the at least one series connection region between the battery cells or the battery modules interrupts the power supply to the external device when the short circuit occurs.

11. The device according to claim 8, wherein the electric vehicle is a hybrid electric vehicle.

12. The device according to claim 1, wherein the pressure driven switches are provided in parallel with the external load.

* * * * *